April 7, 1970 H. M. RUSSELL-FRENCH 3,504,872
SEALING APPARATUS FOR AIRCRAFT CATAPULTS
Filed Feb. 9, 1967 3 Sheets-Sheet 1

INVENTOR.
HARRY M. RUSSELL-FRENCH
BY
William R. Nolte
AGENT

INVENTOR.
HARRY M. RUSSELL-FRENCH
BY
William R. Nolte
AGENT

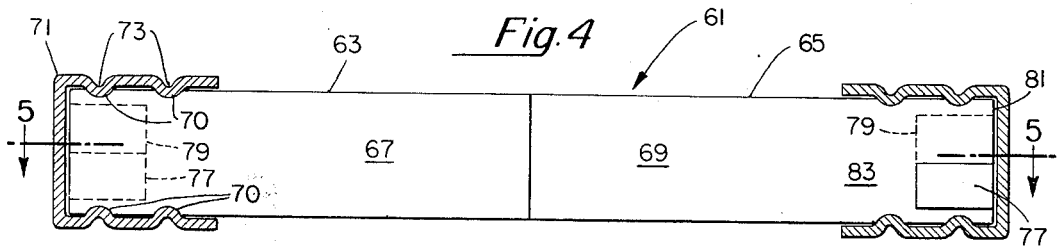
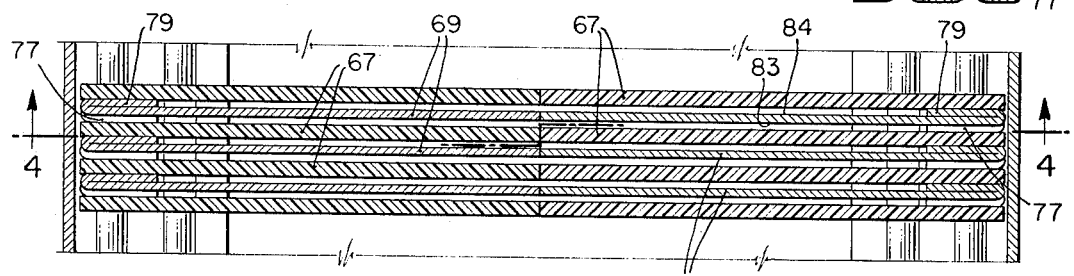
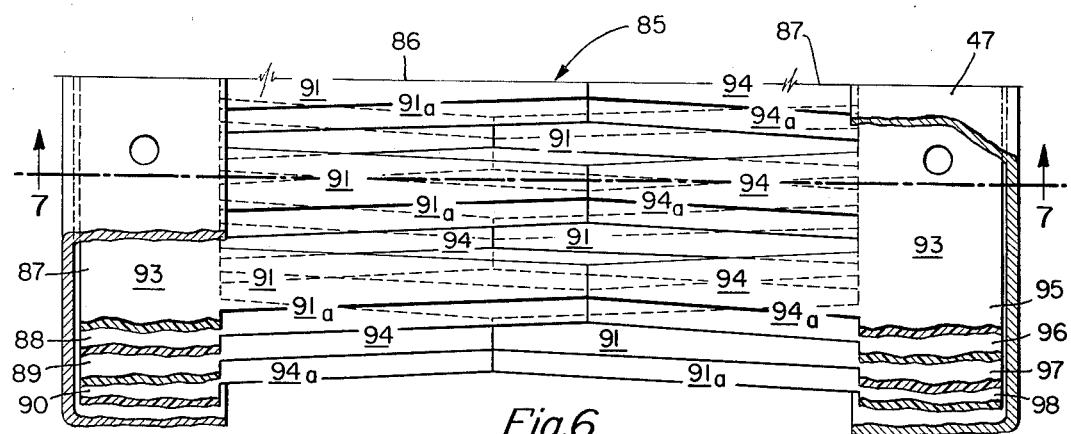
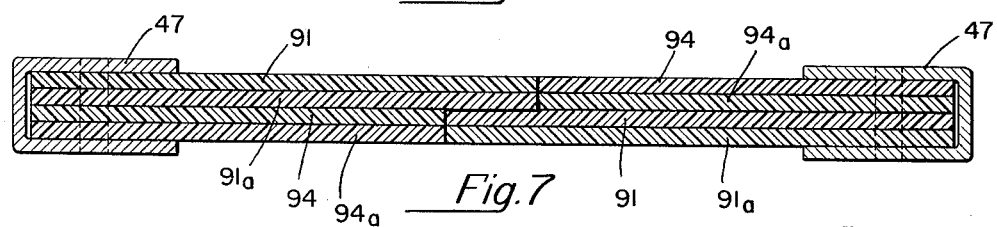

United States Patent Office 3,504,872
Patented Apr. 7, 1970

3,504,872
SEALING APPARATUS FOR AIRCRAFT
CATAPULTS
Harry M. Russell-French, Philadelphia, Pa., assignor to
The Budd Company, Philadelphia, Pa., a corporation
of Pennsylvania
Filed Feb. 9, 1967, Ser. No. 614,841
Int. Cl. B64f 1/06
U.S. Cl. 244—63                                      8 Claims

ABSTRACT OF THE DISCLOSURE

A sealing apparatus for closing the slot in a track cover in which the shuttle of aircraft steam launching engines operate. Overlapping layers of material in the form of spaced fingers are fastened to the underside of opposite margins of the shuttle slot to seal off passage of steam through the slot.

---

This invention relates to sealing apparatus and more particularly, to apparatus for sealing the slot through which a shuttle travels at very high speed.

Known power operated launching systems for aircraft on aircraft carriers include a steam catapult having one or more cylinders below deck and one or more pistons arranged to accelerate a shuttle along a longitudinal slot in the deck. The cylinders are supplied with a common high pressure steam supply to drive the pistons which in turn are connected by a transverse coupling member. The latter member extends through longitudinal slots in the cylinders to drive the shuttle along its slot. Although the slots in the cylinders are sealed, the seals are only partially effective and as a result low pressure steam escaping from the cylinders rises through the shuttle slot in the deck. This steam has been found to be undesirable not only on the part of the deck crew of the aircraft carrier but in addition has seriously degraded the performance of the jet engines as the same are catapulted through the steam during the critical launch run thereby endangering the aircraft and crew.

Accordingly, it is the principal object of this invention, therefore, to provide an improved sealing apparatus for sealing off the slot in which a shuttle travels at high speeds and which avoids one or more of the disadvantages of the prior art arrangements and which has improved safety.

It is a further object of this invention to provide improved sealing apparatus for a shuttle slot having a shuttle driven therealong, and which does not materially hinder the acceleration of the shuttle during its movement.

In accordance with a preferred form of the invention, the sealing apparatus finds use in preventing the escape of steam through a slot in the deck structure of an aircraft having a catapult shuttle mounted for movement along the length of said slot, and comprises a first group of members disposed on one side of and extending transversely of the slot to partially block the same, and a second group of members disposed on the other side of and extending transversely thereof to block the remainder of said slot. The first and second groups of members are flexible to permit passage of the shuttle along the length of the slot. Means are also provided for mounting the first and second groups of members in opposed relationship to the deck structure.

For a better understanding of the present invention together with other and further objects thereof, reference is had to the following description taken in connection with the accompanying drawing and its scope will be pointed out in the appended claims.

In the drawings FIG. 1 shows an aircraft in a position ready for launching from the deck of an aircraft carrier or vessel provided with a steam launching device;

FIG. 4 illustrates a modified form of the invention in which the seating means comprise a plurality of vertically supported sealing elements extending across the slot;

FIG. 5 is a vertical sectional view taken along the line 5—5 of FIG. 4 showing the spacial relationship of alternately disposed sealing elements;

Figure 3:
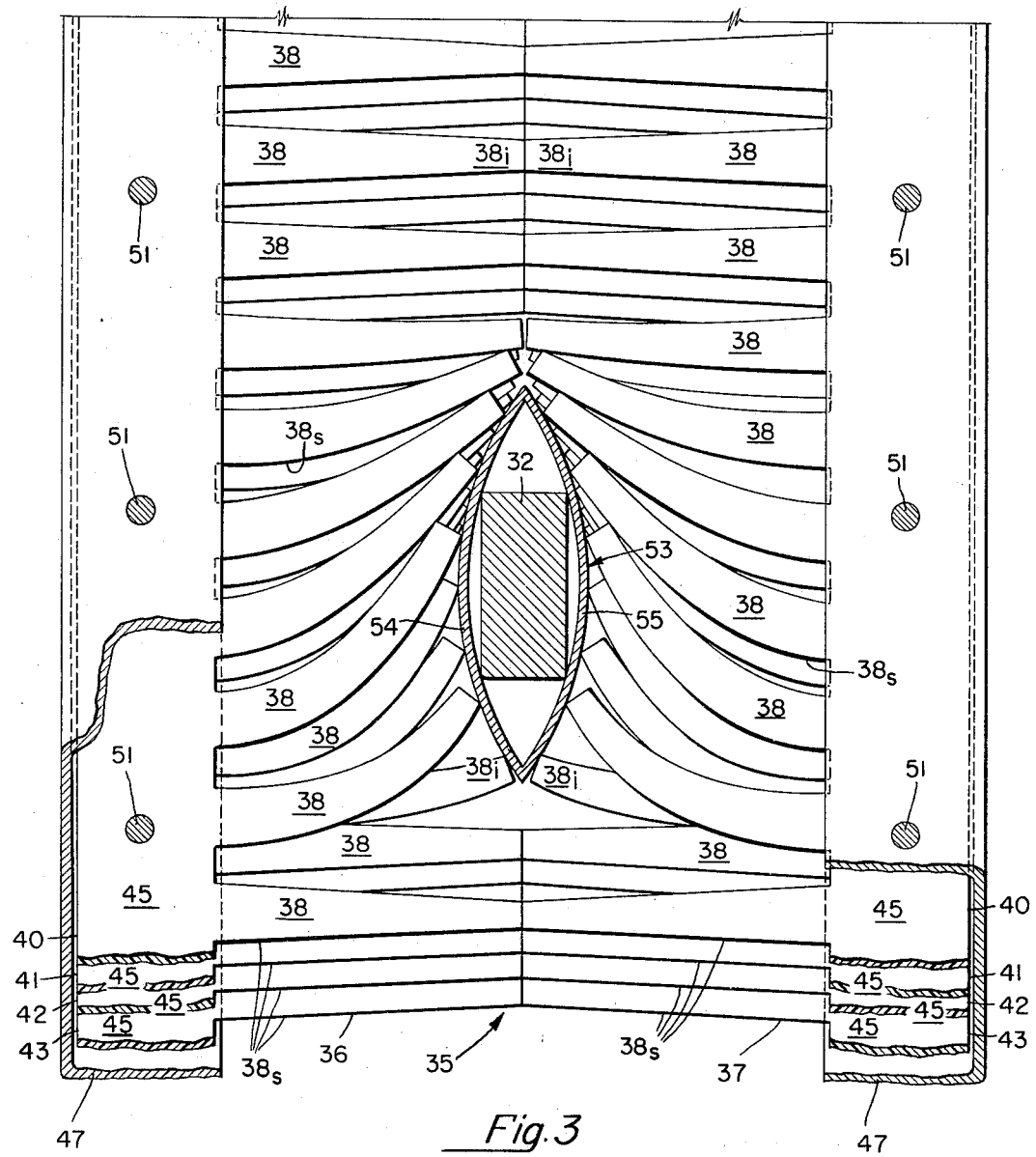
FIG. 3 is a sectional view taken along the line 3—3 of FIG. 2 and showing the sealing apparatus for closing off the shuttle slot in the deck of the aircraft.

FIG. 6 illustrated a further modification of the invention similar to that shown in FIG. 3 in which finger strip portions on opposite sides of the slot are disposed in overlapping relationship;

FIG. 7 is a vertical sectional view taken along the line 7—7 of FIG. 6.

Figures 1, 2:
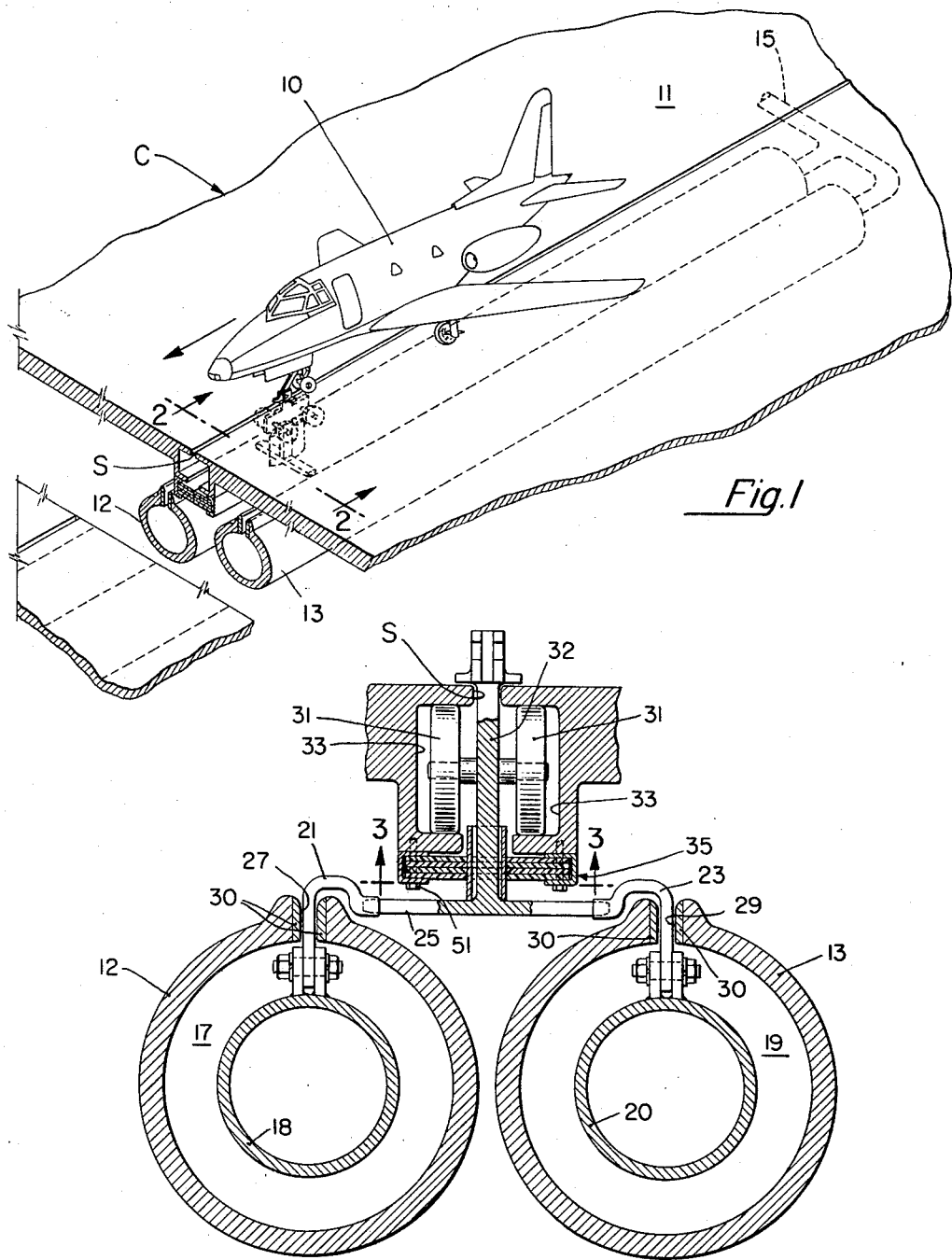
FIG. 2 is a sectional view taken along the line 2—2 of FIG. 1, showing the drive connection between the launching steam cylinders and the shuttle for catapulting the aircraft.

Referring to FIG. 1 of the drawing there is shown an aircraft 10 on the top deck surface 11 on an aircraft carrier C. The aircraft is ready for launching along the path of slot S in the deck. Parallel launching engine cylinders 12, 13 equally spaced from slot S and having a common high pressure steam suppy 15 are mounted below the deck with pistons 17, 19 respectively. The pistons as seen in FIG. 2 include barrel portions 18, 20 which in turn have hook shaped drive members 21, 23 which coact with inverted T-shaped shuttle member 25. The drive members 21, 23 extend through longitudinally disposed slots 27 and 29 and sealing means 30 in the upper wall portions of the cylinders 12, 13. The sealing means 30 are of known type and arranged to open in front of and close behind the ends of the drive members 21, 23 as their respective pistons advance along the cylinders under high steam pressure. The shuttle member 25 is thus driven thereby along slot S to catapult the aircraft from the deck of the carrier. Two pairs of rollers 31 are affixed fore and aft to opposite sides of vertical plate portion 32 of the shuttle. The rollers are received in channel openings 33 which serve to guide the shuttle along the slot S. Due to the nature of the aforementioned slot seals 30, the high pressure of the steam employed within the launching cylinders, and the rapidity with which successive aircraft are launched, the chamber below deck housing the engine cylinders is filled with low pressure steam.

In accordance with the present invention the passage of this low pressure steam through the slot S in the deck surface is substantially obviated by novel sealing means 35 disposed along the under margins of slot S. The sealing means include like groups of sealing members 36, 37 disposed on opposite sides of the slot, each group comprising a plurality of pliant finger members 38. As seen in FIG. 3, the members may be formed from a suitable type of planar sheet plastic material and disposed in vertical layers as for example at 40, 41, 42 and 43. Successive finger members 38 are spaced one from another along the length of the slot and define intervening spaces 38s. The fingers are connected in comblike form along an outer edge by means of a side strip 45. The successive layers of members 40, 41, 42, and 43 are assembled by side channels 47 so that the members 38 of one layer are disposed opposite the spaces 38s in an adjacent layer to thereby retard vertical travel of the steam. Moreover, as seen in FIG. 3 the inner ends 38i of the members 38 of the opposing groups 36, 37 meet at the center of the slot to close the same. The channel members 47 are suitably secured as by bolts 51 to the opposite lower margins forming the slot S in the deck structure.

In order to facilitate the advance of the shuttle along the slot, a shroud 53 encircles the lower vertical portions of shuttle plate 32 and includes curved sides as at 54, 55 which are suitably joined to each other at their opposite ends. As best seen in FIG. 3 the shroud makes contact with tip portions 38i and serves to part the members 38 extending from opposite margins of the slot to slightly bend the same as the shuttle is advanced along its track. As the shuttle is returned a reverse bending from that shown in FIG. 3 occurs.

In accordance with a modified form of the invention as seen in FIGS. 4 and 5 a sealing means 61 is disposed along the under margins of slot S. The sealing means are divided into opposed groups 63, 65 affixed to opposite sides of the slot S to seal the same. Each group includes a plurality of vertically disposed generally rectangular elements 67, 69 and alternately interleaved one with another along the length of the slot. Each member 67 may be formed of a sheet plastic such as Teflon, while members 69 may be of metal such as Navy bronze having a greater stiffness factor than the member 67. As seen in FIG. 4 the top and bottom marginal edges of member 69 define spaced out portions 70. A channel member 71 having inwardly extending vertically spaced flange portions 72 includes longitudinally extending grooves defining bead portions 73 which are received in the aforementioned cut-outs 70 and serve to secure and lock each such members 67 in an upstanding position. The members 69 are likewise of generally similar construction and each also includes cut out portions as at 75 along its top and bottom edge margins. These receive in the same manner the bead portions 73 of channel 71. Each member 69 in addition includes a lower spacer ear 77 and an upper spacer ear 79 extending from its outer margin edge 81. As seen in FIGS. 4 and 5 the lower ear 77 is folded about edge 81 and lies in facing engegement with front face portion 83 thereof. In like manner the upper ear portion 79 is bent about edge 81 in an opposite direction to engage the rear face 84 of the member. The ear portions 77, 79 thus serve to provide a slight space between adjacently disposed member 67.

Referring now to FIGS. 6 and 7, a further embodiment of the invention is shown. In this arrangement a sealing means 85 is shown comprised of two groups of finger elements 86, 87 disposed on opposite sides of the slot. Group 86 is shown as including four layers of pliant planar material 87, 88, 89 and 90. Top layer 87 includes a plurality of long finger portions 91 extending from a back portion 93. The layer 88 therebeneath is of like construction and its finger portions 91 are offset in a fore and aft direction from the fingers 91 above. The third and fourth layers 89, 90 respectively therebeneath include similar back portions 93 and also have finger portions 92, 92a respectively of shorter length than the fingers 91, 91a above. The fingers 92, 92a are also staggered in a fore and aft direction and when coupled with fingers 91, 91a above prevent the passage of steam through the seal. The group of sealing means 87, opposite group 86, likewise includes four layers of finger elements designated 95, 96, 97, and 98 respectively. The top layers 95, 96 include short finger elements 94, 94a, respectively, whose inner extremities meet the inner tip portions of fingers 91, 91a. The lower layers 97, 98 of group 87 include longer finger portions 91, 91a respectively which complement in length the shorter fingers 94, 94a of layers 89, 90 on the opposite side thereof. It is thus seen that the finger members of one group overlap the finger members of the opposite group to provide an effective sealing means to prevent the escape of low pressure steam to the deck above.

While there have been described what are at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In sealing apparatus for preventing the escape of steam through a slot in the deck structure of an aircraft carrier having a catapult shuttle mounted for movement along the length of said slot, comprising in combination, a first group of members disposed on one side of and extending transversely of the slot to partially block the same, a second group of members disposed on the other side and extending transversely thereof to block the remainder of said slot, said first and second groups of members being flexible to permit passage of said shuttle members therebetween and means for mounting said first and said second groups of members in opposed relationship to said deck structure.

2. In the sealing apparatus set forth in claim 1 wherein the members of said first group are disposed in a plurality of layers such that the members in one layer are partially overlapped by individual members in an adjacent layer.

3. In the sealing apparatus set forth in claim 2 wherein said plurality of layers of members of said first group are disposed in planes parallel to said deck surface.

4. In the sealing apparatus set forth in claim 3 wherein the individual members in each layer of said plurality of layers are spaced one from another in the direction parallel to the length of the slot in the deck.

5. In the sealing apparatus as set forth in claim 4 and including a channel member for securing the members of said plurality of layers at their said one ends thereby enabling their opposite ends to be free to be deflected in a direction along the axis of the slot upon travel of the shuttle therealong.

6. In the sealing apparatus as set forth in claim 2 wherein said first group of members disposed on said one side of said slot overlap the second group of members disposed on the other side of said slot.

7. In the sealing apparatus set forth in claim 2 wherein the members of said first and said second groups are planar and are disposed in vertical planes.

8. In the sealing apparatus as set forth in claim 6 wherein alternate members of each group are formed of a plastic material such as Teflon and the intermediate members thereof are formed of a stiffer material than Teflon such as sheet bronze.

References Cited

UNITED STATES PATENTS

| 2,603,190 | 7/1952 | Mitchell | 92—88 |
| 2,721,539 | 10/1955 | Mitchell | 92—88 |

FOREIGN PATENTS 728,038   4/1955   Great Britain.

MILTON BUCHLER, Primary Examiner

P. E. SAUBERER, Assistant Examiner

U.S. Cl. X.R.

49—483; 92—88